UNITED STATES PATENT OFFICE.

NOAK VICTOR HYBINETTE, OF OTTAWA, ONTARIO, CANADA, ASSIGNOR TO KRISTIANSSANDS NIKKELRAFFINERINGSVERKE, OF CHRISTIANSSANDS, S. NORWAY, A CORPORATION OF NORWAY.

EXTRACTION AND RECOVERY OF COPPER.

1,407,420.      Specification of Letters Patent.     Patented Feb. 21, 1922.

No Drawing.      Application filed February 15, 1921. Serial No. 445,107.

*To all whom it may concern:*

Be it known that I, NOAK VICTOR HYBINETTE, a citizen of Norway, residing at Ottawa, Province of Ontario, Dominion of Canada, have invented certain new and useful Improvements in the Extraction and Recovery of Copper; and I do hereby declare the following to be a full, clear, and exact description of the invention, such as will enable others skilled in the art to which it appertains to make and use the same.

This invention relates to improvements in the extraction and recovery of copper from sulfide ores, such as cupriferous iron pyrites, by extracting the copper from the roasted ore with sulfuric acid, electrolyzing the resulting solution for the separation of copper in the form of cathodes, and recovering and returning the acid for the leaching of further amounts of ore.

Among the great obstacles to the successful carrying out of such processes have been, first, the iron extracted with the copper, which has made difficult the electrolysis of the solution, and, second, the failure to extract a sufficiently large portion of copper from the ore.

The present invention largely overcomes or minimizes these objections or obstacles of processes heretofore proposed.

According to the present invention, I subject the sulfide ore to roasting and leaching at least twice, and I treat the ore, after the leaching and before the subsequent roasting operation, with a solution containing sulphates, produced as hereinafter described; and I so carry out the roasting, leaching and electrolyzing operations that the iron content of the electrolyte is held sufficiently low for satisfactory electrolysis, and the copper leached from the ore to a satisfactory degree.

With most of the sulfide ores used as the starting material of the process, I first subject them to desulfurization so that the sulfur can be utilized, for example, in the production of sulfuric acid. If such desulfurization has been carried out at a sufficiently low temperature, and after sufficiently fine crushing, the desulfurized ore may be subjected to leaching without further crushing and roasting; but in most cases it is necessary to re-roast and even to re-crush the ore before the re-roasting operation. The material should be crushed, for example, to about 10 to 20 mesh size, and, for best results in the subsequent leaching operation, should not contain too much fines. It is then roasted at a high temperature, preferably as high as possible without causing sintering of the ore, in order to complete the desulfurization as much as possible and render insoluble the greater part of the iron. If the temperature is too low, desulfurization will be incomplete and a greater amount of soluble iron will be present. Overheating it also objectionable since, if the ore becomes sintered, a silicate of copper may be formed or a part of the sulfides fused, and the extraction of the copper becomes more difficult.

A particularly advantageous method of carrying out the roasting operation is to add to the sulfide ore before roasting a small amount of a solution containing sodium sulfate, as set forth in my prior U. S. Patent No. 1140682, granted May 25, 1915. Instead of adding the sodium sulfate to the sulfide ore before roasting, the solution can be added to the ore after the preliminary desulfurizing and before the re-roasting above described, so that the re-roasting at the higher temperature will be in the presence of the sodium sulfate. This procedure I regard as even more advantageous, with some ores, than the process in which the sodium sulfate is added to the sulfide ore at the outset.

After the roasting of the ore, the roasted ore is subjected to leaching at a comparatively low temperature and with a dilute sulfuric acid solution. The temperature during leaching should be about 40° C., or such a temperature as is obtained without extra provision for heating; but a temperature as high as 70° C. should not be used. The acidity of the acid solution may vary somewhat, but should be about 15 to 50 grams per liter; but it is important that the strength of the acid should be so regulated, as well as the temperature of roasting and leaching, that the resulting solution will not be objectionably high in iron, so that it can be electrolyzed without the use of diaphragms or other objectionable expedients such as reduction with sulfurous acid. The maintenance of a high temperature during roasting, and the avoidance of a temperature which is too high during the leaching, as well as regulation of the acidity of the leach liquor, enable the leaching to be carried out without dissolving objectionable amounts of iron. Solutions can thus be obtained, containing, for example, from 15 to 25 grams of iron per liter, together with some free acid, for example, 15 grams per liter, and also containing from 20 to 50 grams of copper per liter.

The solution thus obtained from the leaching operation is subjected to electrolysis for the separation of more or less of the copper therefrom, as a cathode deposit, and with corresponding increase in the acidity of the solution. The resulting acid solution is then returned for use in further extraction of ore, and in this way is used over and over again. This solution, which is used alternately for the leaching of the ore, and for electrolysis, I will hereinafter refer to as the "circulating solution." With repeated recirculation of this solution, its iron content, and its content of free acid or of other soluble sulfates than iron sulfate will increase, and, when the amounts become objectionable, it is necessary to provide for the removal of the excess. To this end, a certain amount of the circulating solution is drawn off, and water added to the remainder to maintain it at the original or desired average composition.

The portion of the circulating solution which is drawn off, I will hereinafter refer to as the "excess solution." It may be electrolyzed in separate tanks or cells, with or without diaphragms or other devices, and until it has a very low copper content and a correspondingly high free acid content. This electrolysis of the excess solution is not essential, and the solution can be directly used, as hereinafter described, without such preliminary electrolysis.

The ore, after the roasting and leaching above described, still contains a considerable part of its original copper content. This ore is now saturated either with the excess solution above described or with the solution hereinafter referred to as "final solution." It is then dried and subjected to a further roasting; and I find it important to separate the drying operation from the roasting operation. so that the steam from the drying operation will not be admixed with the roaster gases, but will be discharged through separate chimneys or flues. The admixture of the steam and roaster gas, with subsequent condensation of acid therefrom, is detrimental to the flues and objectionable in many other ways well known in the art; but these objections are avoided or minimized by separately drawing off the steam from the drying operation and the dry roaster gas from the roasting operation.

This second roasting operation, following the first roasting and leaching operations, is carried out at about the same temperature as the first roasting. The solution added to the ore before this second roasting operation is made up largely of sulfates and free sulfuric acid. If the "final solution" is used, a considerable amount of iron sulfate will be added to the ore, but this iron sulfate, if the roasting temperature is sufficiently high, will be for the most part decomposed and converted into an insoluble form so that the liquor produced by subsequent leaching of the roasted ore will be low in iron. When the excess solution or final solution added to the ore contains sodium sulfate, this will promote the roasting operation and assist in the subsequent dissolving of the copper from the roasted ore. Any free sulfuric acid returned to the ore with the excess or final solution will be decomposed by the roasting operation, and the sulfur remaining in the ore from the first roasting operation will be practically all eliminated by the second roasting operation.

After such second roasting operation, the ore is subjected to a second leaching with the same circulating solution, and in much the same way, as the first leaching operation, and the resulting solution is admixed with the solution from the first leaching operation; that is, the circulating solution is used for both the first and second leaching operations and the resulting liquors are returned to the electrolytic tanks or cells for electrolysis.

When sodium sulfate is present during the roasting operations, the copper will be for the most part extracted from the ore and only relatively small parts will remain therein after the second roasting and leaching operations. The ore may nevertheless contain a small amount of copper, and this copper can advantageously be recovered by the process of the present invention.

The remaining ore, after the second leaching operation, is then leached at an elevated temperature with the "excess solution" above referred to, and a sufficiently high temperature is used, for example about 70° C., to neutralize most of the free acid of the solution and to dissolve practically all of the copper remaining in the ore, for example, so that the final residue will not contain more than one-tenth per cent or thereabouts of copper, or even considerably less than this amount. If the amount of free acid present in the excess solution is not sufficient, further amounts of acid from some other source can be added to improve the extraction.

The solution obtained from this third leaching operation, carried out at a higher temperature, is the solution which I call "final solution." It is so high in iron content that it is unsuitable for electrolysis for the production of copper. I use it therefore to saturate the ore before the second roasting operation, and the copper therein contained is recovered in the second leaching operation, while the large amount of iron in the final solution will be for the most part decomposed at an elevated temperature and converted into an insoluble form, so that the solution produced by the second leaching operation will not be objectionably high in iron.

As above stated, the process of the present invention is of particular advantage when combined with the process of my prior U. S. Patent No. 1140682. When a small amount of sodium sulfate is added to the sulfide ore before roasting, the roasting operation will be improved and the circulating solution will also contain sodium sulfate. The excess solution and also the final solution will similarly contain sodium sulfate, and, when either of these solutions are returned to the ore after the first leaching operation and before the second roasting operation, the second roasting operation will be improved and benefited by the sodium sulfate contained in the solution. So also, the excess solution or the final solution may be used for supplying a small amount of sodium sulfate to the original sulfide ore, and the copper returned to the ore with such solution will be recovered by the subsequent leaching operation.

When the process of the present invention is properly carried out, the different solutions and wash waters can all be utilized to advantage without the necessity of evaporating them to bring about concentration, or for throwing any of the solutions away. I find that with the raw ore coming into the plant in a fairly dry condition, and with the final residue, after washing, going out saturated with moisture, and with the evaporation of the moisture from the solution returned to the ore before roasting (during the drying operation which precedes the roasting operation), sufficient water can be introduced into the operations to do all of the necessary washing of the residue, and to maintain the electrolyte of appropriate dilution, without the necessity of separate evaporation of any of the solution or liquor.

It will be noted, however, that the process described contemplates the saturation of the ore, after the first leaching operation, with final solution. The ore to which the final solution is added is already saturated with the circulating solution. The replacement of the circulating solution with the final solution can advantageously be carried out in stages, that is, by providing a number of wash waters to be used over and over again, and of compositions intermediate between the circulating solution and the final solution, so that the circulating solution is displaced by the final solution in a series of steps and without the introduction of additional water for that purpose.

While the process of the present invention can advantageously be practiced in conjunction with the process of my said prior U. S. Patent No. 1140682, by adding a small amount of sodium sulfate to the sulfide ore before roasting, I regard it as more advantageous to make use of a solution produced by the process itself, that is, the excess solution or the final solution, and to add such solution to the ore after its preliminary desulfurization and before the first roasting operation carried out upon the ore which has already been desulfurized to a very considerable extent.

I have also found that there is a decided difference between the addition of a solution containing iron sulfate or sodium sulfate to raw sulfide ore and to previously roasted ore. Raw sulfide ores of the character contemplated for treatment by the present invention have practically no power of absorbing water, whereas after roasting they are able to hold a very considerable amount of moisture, e. g., as much as 30% or more. The beneficial influence of such saturation before roasting is lost if applied upon raw ore, whereas, particularly when sodium sulfate is used, the difference between the addition of the sodium sulfate solution to raw ore and to previously roasted ore is such that it can be considered to represent, in many cases, the difference between failure and success of the undertaking.

Where the original ore is subjected to a double preliminary roasting operation, for example, where badly roasted pyrite cinders have to be re-roasted one or more times in order to recover a satisfactory proportion of copper, the final solution or the excess solution can advantageously be added to saturate the ore, after the preliminary roasting or roastings and before the subsequent roasting or roastings, inasmuch as the previous or preliminary roasting of the cinders leaves them able to absorb the solution so that the salts of the solution can react therewith to advantage.

When the roasted ore (as distinguished from the raw sulfide ore) is saturated with the final or excess solution, containing the sulfate salts, the salts of the solution are distributed in a particularly uniform and advantageous manner throughout the body of ore, so that practically all particles of ore are intimately admixed with the salts of the added solution. When the ore containing such added salts is roasted, the salts have an opportunity of acting in a most intimate manner upon the ore constituents. As a result, the subsequent extraction of the copper is promoted while the iron, whether present as sulfate or converted to a greater or less extent into sulfate during the roasting, will be largely converted into an insoluble form by the higher temperatures of the roasting operation, so that the circulating solution used in leaching the ore will be kept low in iron.

I claim:

1. The method of recovering copper from sulfide ores which comprises subjecting ore to at least two successive roasting and leaching operations, subjecting the solutions obtained by the leaching operations to electrolysis for the deposition of copper therefrom, and treating the ore, before the second roasting operation, with a solution of salts which promote the subsequent roasting and leaching operations, the roasting and leaching operations being so carried out, and a sufficient excess of the electrolytic solution being separated, to maintain the iron content of the solution sufficiently low to permit the electrolysis to be carried out without diaphragms.

2. In the process of claim 1, the addition of sodium sulfate so that it is present during at least one of the subsequent roasting operations and in the electrolyte.

3. The method of recovering copper from sulfide ore which comprises subjecting the ore to at least two successive roasting and leaching operations, subjecting the solutions obtained by the leaching operations to electrolysis for the deposition of copper therefrom, returning the electrolyte for further leaching of ore, withdrawing a sufficient excess of the electrolyte to maintain the iron therein at a low concentration, subjecting the ore, after the second leaching operation, to a third leaching with such excess solution at an elevated temperature, and adding the solution obtained from this third leaching operation to the ore before the second roasting operation.

4. The method of recovering copper from sulfide ore which comprises subjecting the ore to at least two successive roasting and leaching operations, subjecting the solutions obtained by the leaching operations to electrolysis for the deposition of copper therefrom, returning the electrolyte for further leaching of ore, withdrawing a sufficient excess of the electrolyte to maintain the iron therein at a low concentration, and subjecting the ore, after the second leaching operation, to a final leaching at a higher temperature than the preceding leaching operations.

5. The method according to claim 4 in which free sulfuric acid is added during the final leaching to increase the extraction of copper.

In testimony whereof I affix my signature.

NOAK VICTOR HYBINETTE.